United States Patent [19]

Peters

[11] Patent Number: 4,579,067
[45] Date of Patent: Apr. 1, 1986

[54] COMBUSTION REACTOR

[75] Inventor: John C. Peters, Vancouver, Canada

[73] Assignee: Ecolotec Research Inc., Vancouver, Canada

[21] Appl. No.: 683,575

[22] Filed: Dec. 19, 1984

[51] Int. Cl.$^4$ .............................................. B09B 3/00
[52] U.S. Cl. .................................. 110/235; 110/256; 110/259; 110/264
[58] Field of Search ............... 110/256, 118, 264, 245, 110/346, 235, 259

[56] References Cited

U.S. PATENT DOCUMENTS 3,482,533 12/1969 Ankersen .................... 110/118 X
3,785,304 1/1974 Stookey .................... 110/118 X
3,888,193 6/1975 Kishigami et al. .......... 110/346 X Primary Examiner—Edward G. Favors
Attorney, Agent, or Firm—D. R. Morrison

[57] ABSTRACT

A combustion reactor which includes a reactor housing having an interior chamber, an inlet port at a top end of the housing and an outlet port at a bottom end thereof. The interior chamber has a circular cross-section, the diameter of which continuously increases from the inlet port to an intermediate level and then continuously decreases to the outlet port. A gas inlet conduit opens into the interior chamber adjacent to the inlet port at a location and in a direction tangent to a notional circle whose center lies on the axis of the interior chamber. By directing a high velocity flow of gas containing oxygen into the chamber tangent to the interior surface thereof and initially a combustible gas, upon ignition of the combustible gas and feeding into the inlet port combustible material, combustion of the fuel material takes place as the latter progresses from the inlet to the outlet.

13 Claims, 3 Drawing Figures

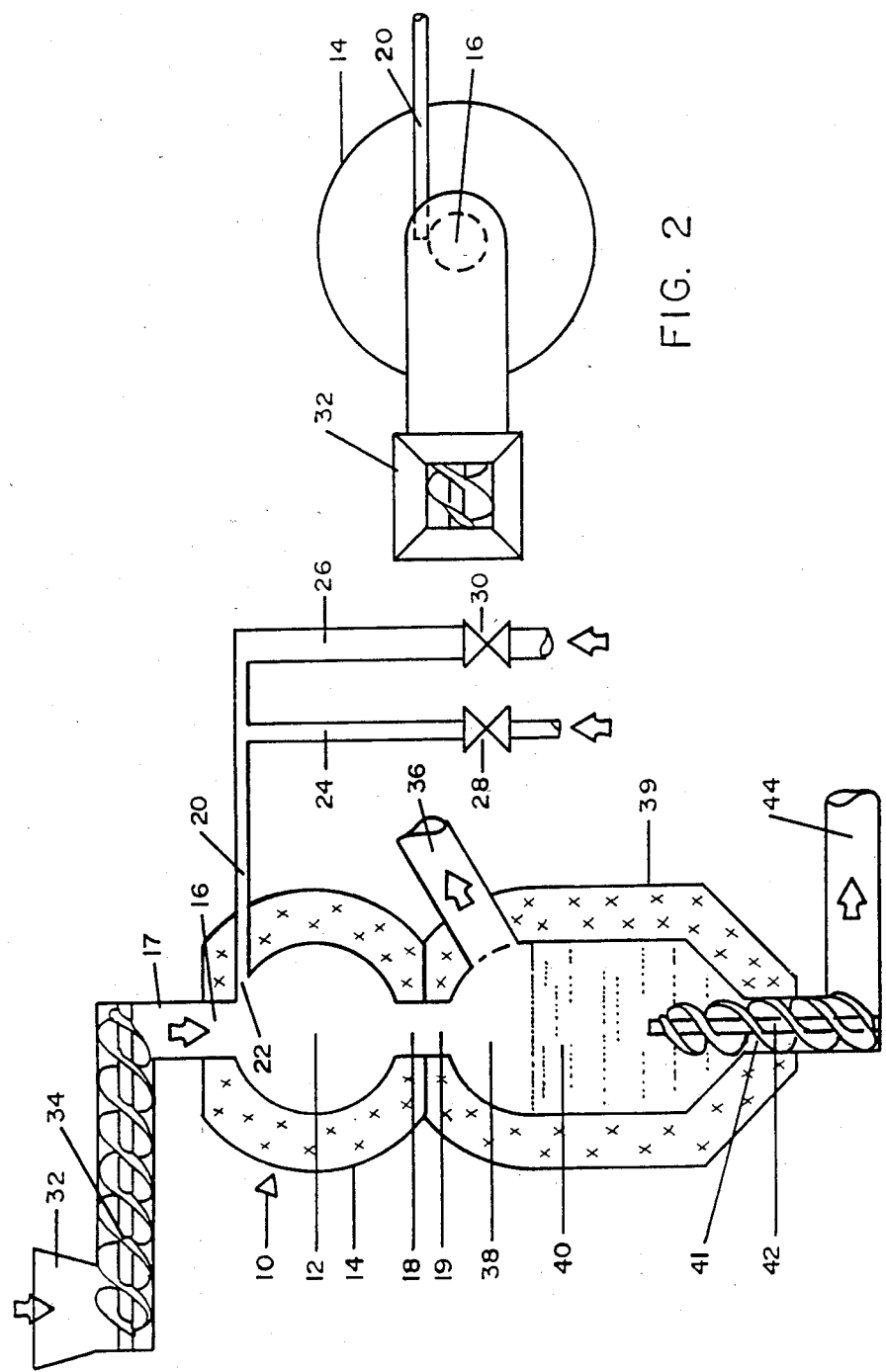

COMBUSTION REACTOR

BACKGROUND OF THE INVENTION

The present invention relates to a combusion reactor for burning fuel material such as garbage at high temperatures.

Conventional furnaces operate by burning fuel at a bottom of the furnace and exhausting the hot gas out the top generally through a chimney or smoke stack. Usually the combustion takes place at relatively low temperatures and under such conditions a large number of pollutants are produced. These pollutants flow out of the furnace with the hot exhaust gas creating objectional environmental problems. Moreover, the combustion when occurring at such a low temperature is unable to burn a large number of materials which require high temperatures for their combustion. Such furnaces permit the hot exhaust gases to escape immediately following their creation and do not in any way internally increase the temperature by movement of either the fuel material or the combustion gases. As a result, conventional furnaces require a continuous supply of highly combustible fuel such as coal, natural gas, etc. in order to operate.

Secondly, conventional furnaces must be large in order to burn a significant amount of material as combustion in such furnaces takes a relatively long time. The long combustion time and the fact that the material being burned ordinarily remains stationary makes it difficult and somewhat impractical to incorporate a continuous feed and waste removal system with such furnaces.

SUMMARY OF THE INVENTION

According to the invention there is provided a combustion reactor which includes a reactor having an interior chamber of circular cross-section, the diameter of which continuously increases from the inlet port to an intermediate level and then continuously decreases to the outlet port, inlet and outlet ports at the top and bottom, respectively, of the chamber, and a gas inlet conduit which opens into the chamber at a location and in a direction tangent to a circle whose center lies on the axis of the interior chamber.

Advantageously, the interior chamber is substantially spherical and the notional circle center lies on an axis through the center of the spherical chamber passing through the inlet and outlet ports. Preferably, the combustion reactor includes a pressurizable inlet line coupled to the inlet port for feeding fuel material into the interior chamber.

The gas inlet conduit may connect to an oxygen circuit couplable to a source of gas containing oxygen and a combustible gas conduit couplable to a source of combustible gas. Gas valve means may be coupled to the oxygen and combustible gas conduits for controlling the flow of gas therein.

The pressurized inlet line may include a fuel feed control for controlling the rate of feed of fuel material into the interior chamber of the reactor housing. An exhaust chamber may be coupled to the outlet port of the reactor for receiving combustion exhaust material from the reactor housing. The exhaust chamber, in turn, may have a hot gas outlet for directing hot exhaust gases out from the exhaust chamber. The exhaust chamber may also include a solid material exhaust line for removing solid material left after combustion of the fuel material in the reactor housing.

A heat exchanger may be coupled to both the hot gas outlet of the exhaust chamber and to the gas inlet conduit for pre-heating gas before entering the interior chamber.

Preferably the reactor housing is made of refractory castable material or a ceramic material.

A combustion reactor system may be formed by interconnecting a primary plurality of reactor housings each having a spherical interior chamber with an outlet of a first one coupled to the inlet of a second one and for each reactor housing after the first one, the inlet being coupled to the outlet of a preceding reactor housing and the outlet being coupled to an inlet of a subsequent reactor housing. Each housing has a plurality of reactor housings having a gas inlet conduit opening into the associated interior chamber at a location and in a direction tangent to a circle whose center lies on a line through the center of the interior chamber and through the center of the inlet and outlet ports, and adjacent the inlet port. The inlet port of the first reactor housing may be coupled to a pressurizable inlet line for feeding fuel material into the first reactor housing.

An oxygen conduit couplable to a source of pressurized oxygen containing gas, and a combustible gas conduit couplable to a source of pressurized combustible gas are each coupled to the gas inlet conduits. A primary exhaust chamber may be coupled to an outlet port of the last of the reactor housings. The exhaust chamber may have a hot gas outlet for directing hot gases produced in the cumbustion out of the exhaust chamber and a solid material exhaust line for removing solid material left after combustion from the exhaust chamber. The system may include a heat exchanger coupler to the hot gas outlet and to each of the gas inlet conduits for pre-heating the oxygen containing gas prior to entry into the associated interior chamber of the reactor housings.

A second combustion reactor system may be coupled to the primary combustion reactor system by coupling the hot gas outlet of the primary exhaust housing to the inlet port of the first reactor housing of the second plurality of reactors and coupling the solid material exhaust line to a solid waste separator. The solid waste separator may be employed in the exhaust line from the first system to separate out desired materials such as aluminum and iron. A waste line is coupled to the separator to direct the remaining solid material left after separation into the inlet port of the first reactor housing of the second plurality of reactors. The hot gas outlet from the second plurality of reactors may be coupled to a heat exchanger for transferring heat to the oxygen containing gas prior to the latter being fed into the reactor housings of the primary and second plurality of reactors.

Gas fed into the chamber tangentially to the interior chamber proximate the inlet is directed in a circulating manner around the interior chamber first diverging toward the middle of the chamber and then converging toward the outlet port with the incoming gas travelling at a high velocity. Considerable energy is added through the latter motion once combustion is initiated, creating much higher temperatures than would ordinarily be expected. The termperature level in the interior of the chamber may be controlled by either adjusting the amount of fuel material fed into the chamber through the inlet port or adjustment of the amount of oxygen containing gas fed into the chamber.

To get the combustion started and the temperature level raised, a combustible gas such as natural gas or propane may be used in combination with the oxygen containing gas which may be air.

Once the furnace is operating, it is possible to shut off the supply of combustible gas as the energy released by the combustion of the fuel material itself is sufficient to maintain combustion. Ordinarily it is necessary to pressure feed the incoming fuel material, however if a spherical interior chamber is used, the amount of pressure required for feeding is extremely small. The efficiency of the spherical shape is much greater than any other shape.

By utilizing refractory castable material or ceramic material as the reactor housing, temperatures up to 3,000° Fahrenheit can be easily achieved. At such high temperatures combustion of almost any material is complete and the number of pollutants created is relatively small.

The efficiency of the entire system can be improved significantly by pre-heating the oxygen containing gas fed into each of the reactor housings. By utilizing two sets of combustion systems, each having a plurality of reactor housings coupled together, it is possible to operate the first combustion reactor system at a temperature below the melting point of metal such as aluminum and then to separate out the metal from any other material that may have been introduced and then to run the remaining material into the inlet port of a second stacked array of reactor housings. The temperature level of operation of the second stacked array may then be raised to say 3000° Fahrenheit in order to produce a sterilized ash than can be used in the fabrication of light-weight concrete.

Thus, the combustion reactor may be utilized for such applications as burning garbage with the concurrent extraction of metals and the production of sterilized ash as well as any other applications which require the production of high temperatures.

BRIEF DESCRIPTION OF THE DRAWINGS

FIG. 1 is a sectional view in elevation of a single reactor system;

FIG. 2 is a plan view of the apparatus shown in FIG. 1; and

DETAILED DESCRIPTION WITH REFERENCE TO THE DRAWINGS

Figure 3:
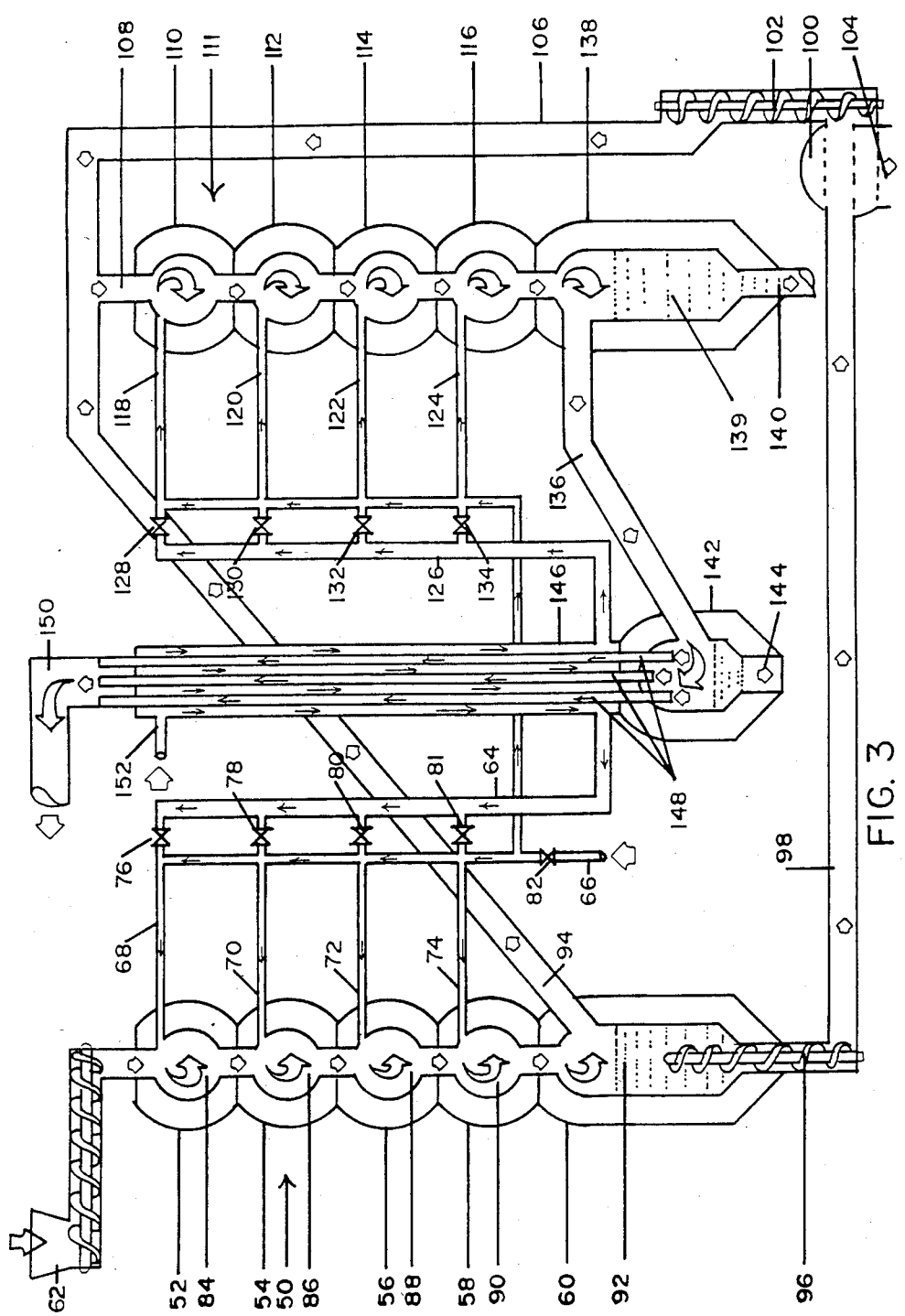
FIG. 3 is an elevation view of a combustion reactor system employing two sets of interconnected reactors.

A single combustion reactor system illustrated in FIG. 1 consists of the combustion reactor 10 having a housing 14 of a refractory castable material capable of withstanding temperatures of over 3,000° Fahrenheit and molded so that it has a spherical interior surface defining an interior chamber 12. Reactor housing 14 has an inlet port 16 at a top thereof and an outlet port 18 at its bottom aligned with the inlet port 16. An inlet conduit 20 passes through the reactor housing 14 proximate the inlet port 16 and, as shown in FIG. 2, enters into the interior chamber 12 at a point and along a direction tangent to a circle whose center is on a line passing through the center of the inlet port 16 and outlet port 18. The gas inlet conduit 20 is coupled to an oxygen line 24, connected through a valve 28 to a source of gas containing oxygen (not shown) and to a combustible gas line 26 coupled through a gas valve 30 to a source of combustible gas (not shown).

Solid fuel material is fed to inlet port 16 through a pressurized inlet line 17. An auger 34 is used to pressurize line 17 and convey feed material entering hopper 32. An exhaust chamber 39 is coupled to reactor housing 14 such that inlet port 19 of the the exhaust chamber 39 is aligned with the outlet port 18 of the reactor housing 14. Exhaust chamber 39 has an outlet port 41 in which there is located an auger 42 for discharging solid material 40 left after combustion within chamber 12. Outlet port 41 is coupled to an outlet line 44.

In operation, valves 28 and 30 are opened by a preselected amount in order to allow pressurized combustible gas together with a source of pressurized oxygen containing gas, such as air, to enter inlet conduit 20 into gas inlet opening 22. The gas is ignited by any convenient means such as, for example, by dropping a burning piece of paper into the interior chamber 12 or arranging for any other means of ignition.

Once ignited, solid material entering hopper 32 is conveyed by auger 34 along inlet line 17 through the inlet port 16 entering into the chamber interior 12. Such solid material is ignited within the chamber interior upon being contacted by the ignited, fast moving gas. Combustion by-products then pass out through outlet 18 and inlet 19 of exhaust chamber 39 into the exhaust chamber interior 38. The solid material 40 falls on the bottom of the chamber 38 while the hot exhaust gases pass out through hot gas outlet 36. The solid material 40 is moved out through outlet 41 by the action of auger 42 into an exhaust line 44. Once solid fuel material is fed into the chamber 12 with combustion taking place therein, the energy released from this combustion is sufficient to maintain further combustion without the need for combustible gas. Consequently, once combustion has commenced, valve 30 may be closed to shut off the supply of combustible gas, leaving only air entering into chamber 12.

Considering the amount of time that any incoming solid fuel material which enters through inlet port 16 spends within chamber 12, it may be that for particular types of material at a given selected operating temperature, combustion will be incomplete.

FIG. 3 illustrates a system in which several combustion reactors are stacked in an array in order to ensure that all fuel material undergoes complete combustion. In this case, a primary plurality of reactor housings 52, 54, 56 and 58 are mounted one on top of the other with their inlet and outlet ports aligned and a stacked array of reactor housings mounted onto exhaust chamber housing 60. Coupled to the inlet port of the first reactor housing 52 is an inlet feed system similar to that in FIG. 1 shown only by the hopper 62. The reactor housings 52, 54, 56 and 58 each have spherical interior chambers 84, 86, 88 and 90, respectively. Each reactor housing 52, 54, 56 and 58 has an associated inlet conduit 68, 70, 72 and 74, respectively.

Combustible gas such as natural gas, propane, etc. is directed through a gas control valve 82 into a gas line 66 which couples to each inlet conduit 68, 70, 72 and 74. Pre-heated air is directed into air line 64 and passes through air control valves 76, 78, 80 and 81 into corresponding inlet conduits 68, 70, 72 and 74, respectively.

A second array of stacked reactor housings 110, 112, 114 and 116 mounted onto a second exhaust housing 138 is coupled to hot air line 94 which directs hot exhaust gases into inlet port 108 of reactor housing 110. Each reactor housing 110, 112, 114 and 116 has an associated inlet conduit 118, 120, 122 and 124, respectively. Gas line 66 also couples to each of the inlet conduits 118, 120, 122 and 124. Pre-heated air running through air line 126 couples to inlet conduits 118, 120, 122 and 124 through air control valves 128, 130, 132 and 134, respectively. Exhaust solids output line 98 into which waste material from exhaust chamber 92 is directed by means of auger 96, runs into a separation chamber 100 where separation of the metals and the other solid waste material is accomplished.

Materials such as, for example, aluminum and iron may be directed out of the system by means of auger 104 while other waste materials are directed by means of auger 102 along waste line 106 into the inlet port 108 of reactor housing 110. A hot gas exhaust line 136 couples the chamber of second exhaust housing 138 into a distribution chamber 142. Communicating with the interior of the distribution chamber 142 are a plurality of exhaust tubes 148 running up through a sleeve 146 which is sealed at both its bottom and its top. At the bottom of the distribution chamber 142 is an exhaust port 144 for permitting the removal of any remaining solid material deposited by the hot gases coming from the exhaust 138. The combination of sleeve 146 and exhaust tubes 148 make up a heat exchanger having an inlet port 152 at a top thereof and a pair of outlet ports coupled to tubes 64 and 126. The top of the heat exchanger 146 is coupled to a smoke stack 150 into which exhaust tubes 148 are connected. Inlet 152 is coupled to a source of compressed air.

In operation, solid fuel material such as a shredded garbage is directed into the chamber 84 of reactor housing 52 and passes through successive chambers 86, 88 and 90, wherein material undergoes combustion. The temperature in each of the chambers 84, 86, 88 and 90 is set by controlling the amount of compressed air passing through inlet conduits 68, 70, 72 and 74. The latter setting is made depending on the rate of solid material entering into reactor chamber 84. Typically, the temperature of the primary array of reactor housings 50 is approximately 1,000° Fahrenheit. By operating the combustion reactors at this temperature, metals will not be vapourized within the reactors, but will pass unmelted into exhaust chamber 92 where they will be directed by auger 96 along exhaust line 96 into separation chamber 100. The solid metals such a aluminum and iron can then be separated and stock-piled for sale. Hot gas from exhaust chamber 92 which also contains some solid particles is directed into the second array of stacked combustion reactors 111 as is waste material following separation from the metals in separation chamber 100.

The second set of reactors 111 are operated at a temperature of approximately 2,000° Fahrenheit, thereby ensuring complete combustion of any materials entering into inlet port 108. The final combustion by-product in exhaust chamber 138 is made up of sterilized ash 139 which settles at the bottom of the chamber and hot gas, which flows out through hot gas line 136. The sterilized ash 139 is available and useful for the manufacture of light-weight concrete.

The hot gases which are directed into distribution chamber 142 pass up through exhaust gas lines 148 and heat compressed air which is directed into the heat exchanger 146 by means of inlet port 152. The pre-heated air is then directed out the bottom of the heat exchanger through air line 64 and 126. By pre-heating the air a much greater efficiency of combustion is achieved in the combustion reactors.

Since the final combustion takes place at such a high temperature level, the number of pollutants that are produced as a result of the combustion is relatively small compared to the number which would be produced in an ordinary furnace.

Other variations, modifications, and departures lying within the spirit of the invention and scope as defined by the appended claims will be obvious to those skilled in the art.

I claim:

1. A combustion reactor, comprising (1) a reactor housing having an interior chamber, said chamber being substantially spherical and having an inlet port at a top end thereof and an outlet port at a bottom end thereof, (2) a gas inlet conduit opening into the interior chamber adjacent to the inlet port at a location and in a direction tangent to a notional circle whose center lies on the axis of the spherical chamber which passes through the inlet and outlet ports, (3) a pressurizable inlet line coupled to the inlet port for feeding fuel material into the interior chamber, (4) an oxygen conduit coupled at one end to said gas inlet conduit and couplable at another end to a source of pressurized oxygen containing gas, (5) a combustible gas conduit coupled at one end to said gas inlet conduit and couplable at another end to a source of pressurized combustible gas, and (6) gas valve means coupled to said oxygen conduit and said combustible gas conduit for controlling the flow of combustible gas and oxygen containing gas into the interior chamber.

2. A combustion reactor as defined by claim 1, wherein said inlet line includes a fuel feed control for controlling the rate of feed of fuel therein.

3. A combustion reactor as defined by claim 2, including an exhaust housing having an exhaust chamber coupled to the outlet of said reactor housing for receiving combustion exhaust material from said reactor housing.

4. A combustion reactor as defined by claim 3, wherein said exhaust housing has a hot gas outlet and a solid material exhaust outlet for removing gaseous and solid combustion exhaust material from the exhaust chamber, respectively.

5. A combustion reactor as defined by claim 4, including a heat exchanger coupled to the hot gas outlet and to the oxygen conduit for pre-heating oxygen containing gas prior to its entry into the interior chamber.

6. A combustion reactor as defined by claim 1, wherein the reactor housing is of a material selected from the group consisting of a refractory castable and a ceramic material.

7. A combustion reactor system comprising (1) a primary plurality of reactor housings, each housing having a spherical interior chamber with an inlet port at a top thereof and an outlet port at a bottom thereof, axially aligned with the inlet port, an outlet port of an $n^{th}$ of said plurality of housings being coupled to an inlet port of an $(n+1)^{th}$ of said housings and an inlet port of said $n^{th}$ housing being coupled to an outlet port of a $(n-1)^{th}$ of said primary plurality of housing where n can take the values 2, 3, . . . up to 1 less than the total number of housings, (2) a gas inlet conduit opening into the interior chamber of each housing adjacent its inlet port at a location and in a direction tangent to a notional circle whose center lies on an axis through the center of the interior chamber and passes through the center of the inlet and outlet ports, (3) a pressurizable fuel feed inlet line coupled to an inlet port of a first of said housings, (4) an oxygen conduit coupled to each of said gas inlet conduits and couplable to a source of pressurized oxygen containing gas, and (5) a combustible gas conduit coupled to each of said gas inlet conduits and couplable to a source of pressurized combustible gas.

8. A combustion reactor system as defined by claim 7, wherein said inlet line includes a fuel feed control means for controlling the rate of feed of fuel into the first of said reactor housings.

9. A combustion reactor system as defined by claim 8, including a primary exhaust housing having an exhaust chamber therein, coupled to the outlet port of the $(n+1)^{th}$ reactor housing for receiving combustion exhaust material from said $(n+1)^{th}$ reactor housing.

10. A combustion reactor system as defined by claim 9, wherein said exhaust housing has a hot gas outlet and a solid material exhaust outlet for removing gaseous and solid combustion exhaust material, respectively from the exhaust chamber.

11. A combustion reactor system as defined by claim 10, including a heat exchanger coupled to the hot gas outlet and to the oxygen conduit for pre-heating oxygen containing gas prior to its entry into the interior chambers of said reactor housings.

12. A combustion reactor system as defined by claim 7, including a second plurality of reactor housings, each housing having a spherical interior chamber with an inlet port at a top thereof and an outlet port at a bottom thereof axially aligned with the inlet port, a gas inlet conduit opening into the interior chamber of each housing adjacent to its inlet port at a location and in a direction tangent to a notional circle whose center lies on an axis through the center of the interior chamber and passes through the center of the inlet and outlet ports, and outlet port of a $k^{th}$ of said plurality of housings coupled to an inlet port of an $(k+1)^{th}$ of said housings and an inlet port of said $k^{th}$ housing coupled to an outlet port of a $(k-1)^{th}$ of said plurality of housings where k can take the values 2, 3, . . . up to 1 less than the total number of reactor housings in said second plurality of housings, a second exhaust housing having an exhaust chamber coupled to the outlet port of said $(k+1)^{th}$ housing having a hot gas outlet port and a solid combustion exhaust material outlet port, a hot gas tube interconnecting the hot gas outlet of the primary exhaust housing housings and the inlet port of the first reactor housing in said second plurality of housings, the solid exhaust material outlet of the primary exhaust housing coupled to a solid separator wherein selected material is separated out from said solid exhaust material, and a waste tube coupled between said separator and the inlet port of said first reactor housing of said second plurality of reactors for directing remaining solid exhaust material into said first reactor interior chamber of said second plurality of reactors.

13. A combustion reactor system as defined by claim 12, including a heat exchanger coupled to the hot gas outlet of said exhaust housing in said second plurality of reactors and to the oxygen conduits of said first and second plurality of reactors for pre-heating oxygen containing gas before entry into said reactor housings of said first and second set of housings.

* * * * *